March 2, 1954

M. C. RANSEEN 2,670,916

CARD SUPPORTING DEVICE

Filed Feb. 16, 1950

INVENTOR.
MAURITZ C. RANSEEN
BY Paul, Paul & Moore
ATTORNEYS

March 2, 1954     M. C. RANSEEN     2,670,916
CARD SUPPORTING DEVICE

Filed Feb. 16, 1950     3 Sheets-Sheet 2

INVENTOR.
MAURITZ C. RANSEEN
BY Paul, Paul & Moore
ATTORNEYS

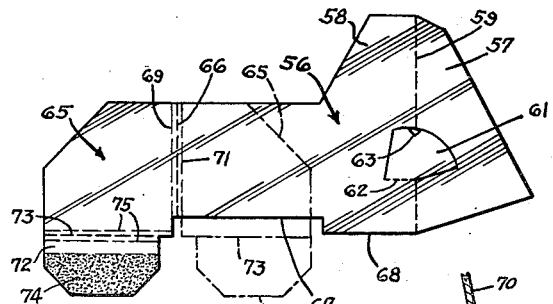
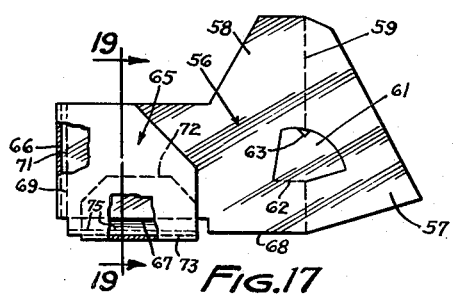
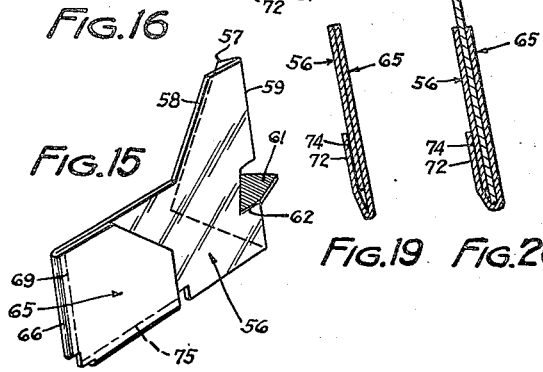
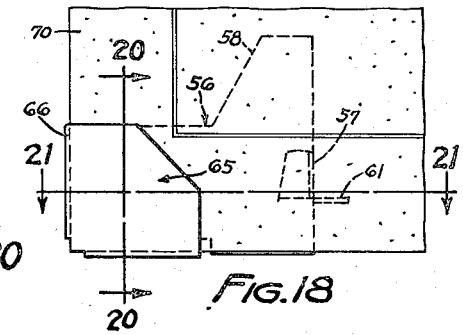
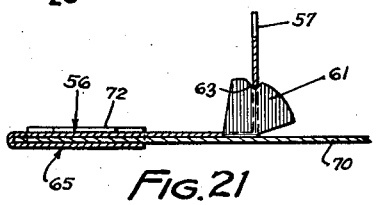
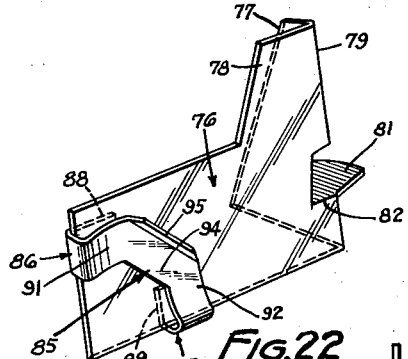
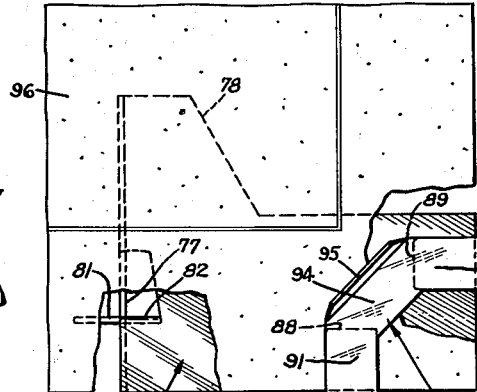
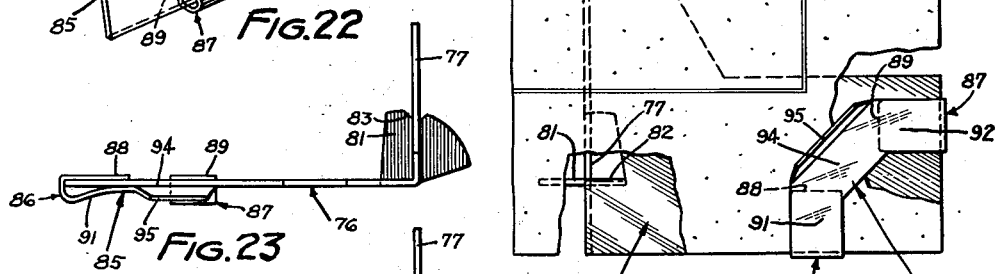
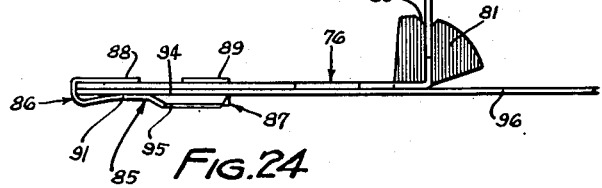
INVENTOR.
MAURITZ C. RANSEEN
ATTORNEYS Patented Mar. 2, 1954

2,670,916

UNITED STATES PATENT OFFICE 2,670,916

CARD SUPPORTING DEVICE

Mauritz C. Ranseen, Minneapolis, Minn.

Application February 16, 1950, Serial No. 144,513

12 Claims. (Cl. 248—35)

This invention relates to devices for supporting and displaying articles such as posters, display cards, photographs and analogous flat articles whereby such articles are supported in an upright position.

The device of the present invention is an improvement on the device disclosed in my Patent No. 2,576,969, for "Device for Displaying Merchandise," granted December 4, 1951.

Devices now in use for supporting display cards, posters and the like are relatively expensive. Large run, specially printed cards or posters, are often provided with an easel glued to the back thereof for supporting the card. The addition of the glued easel increases the cost of the card and when the card is thrown away the easel goes with it.

Other card supporting devices include metal or plastic stands wherein clamping means are disposed to receive the lower marginal edge of the card at a median portion of the card. Other devices include wooden or plastic blocks which are provided with slots cut into their upper surfaces in which the lower edge of the card is disposed and thus supported thereon. Another common practise for supporting small cards and price tags in an upright position is to run two common pins thru the card adjacent its lower edge, in spaced relation, whereby the rearwardly extending pins provide means for preventing rearward tipping of the card.

It is an object of the present invention to provide a detachable card supporting device of simple, economical construction adapted to be designed to fit cards of varying sizes and/or thicknesses. The detachability of the device means that it may be used over and over again and thus not thrown away when the card has served its purpose.

An important object of the present invention is to provide a detachable supporting device whereby a show card, price tag or similar flat article may be provided with means for maintaining it in an upright position upon a suitable supporting surface.

Another object of the invention is to provide a device adapted to support a card or similar flat article in an upright, rearwardly tilted position.

A further object is to provide a card supporting device whereby the device functions to maintain the card in an upright position in such manner that the full weight of the card is not carried by the supporting device.

A still further object is to provide a card supporting device formed from a single blank cut from a sheet of flat material wherein the component parts of the blank may be folded to form either a "right" or a "left" supporting device.

Features of the present device include the provision of a back panel member having a rearwardly extending supporting panel which is adapted to maintain the back panel in an upright position, and a front panel member disposed in flatwise relation to the back panel member whereby common superimposed areas are provided between said panels whereby a portion of a card may be interposed between said superimposed areas thereby to maintain the card against the back panel member.

Another feature of the present device is the provision of a front panel member formed integrally with the back panel member wherein the front panel is adapted to be folded into flatwise relation to the back panel about an edge common to both panel members.

An important feature of the present device is the flatwise relation of the front and back panel members wherein said panels are secured together along only a portion of their common superimposed areas whereby separation of the unsecured superimposed areas of the panel members is resisted by the secured together portions.

Other objects and additional features of the invention will appear from the following description and the accompanying drawings and will be pointed out in the annexed claims.

Figure 9:
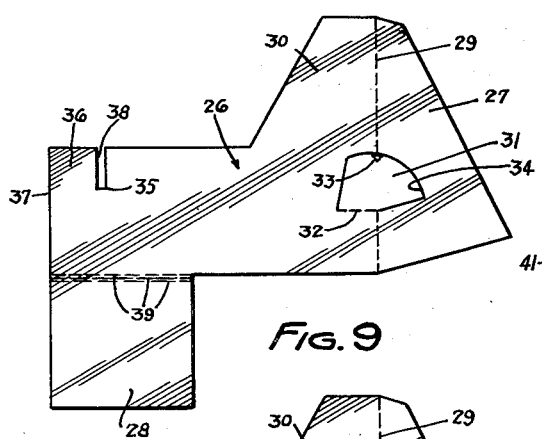
Figure 10:
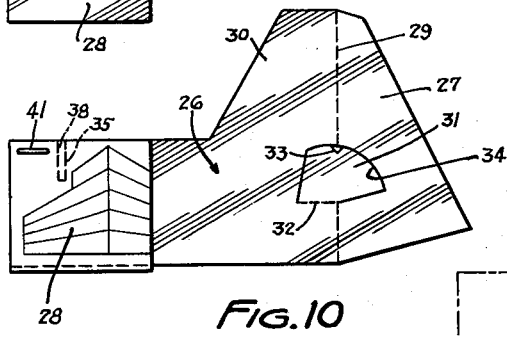
Figures 11, 14A:
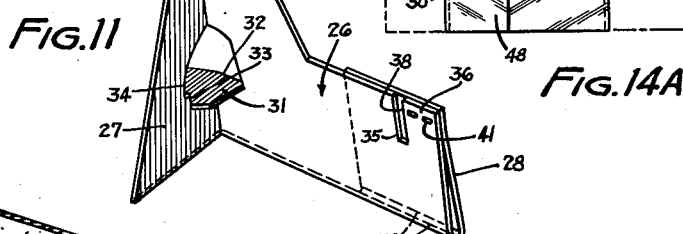

Figures 8 to 14, inclusive, illustrate a card supporting device embodying features of the present invention including the provision of a vertical slit in the back panel member whereby the front and back panel members provide a yieldable pocket into which a card is readily insertable with no resultant distortion of the front panel member;

Figure 14A illustrates a device similar to the device of Figs. 8 to 14 with the exception that the front panel member is folded into superimposed relation to the back panel member about a vertical edge common to both panel members;

Figures 15 to 21, inclusive, illustrate a further embodiment of the invention wherein the front panel member is folded into flatwise relation to the back panel member about a common vertical edge and wherein the front panel member is provided with an integral tab which is folded into engagement with the back panel member and secured thereto;

Figures 22 to 25, inclusive, illustrate a card supporting device embodying resilient clamping means overlaying a portion of the front face of the back panel member.

Figure 4:
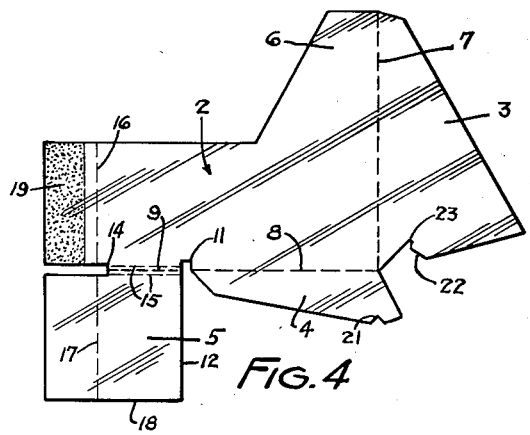
Figure 4 is a view of the flat blank from which the device of the invention may be formed.
Figure 3:
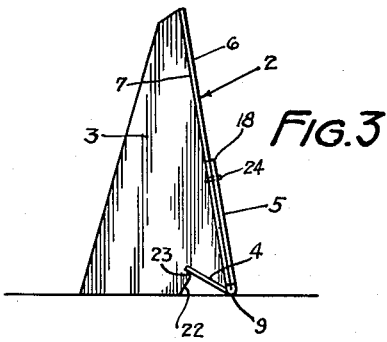
Figure 3 is an end view of the device taken from the left hand side of Fig. 2.

In the selected embodiment of the invention herein disclosed, there is illustrated in Figures 1 to 7, inclusive, a card supporting device comprising a back panel member 2 provided at one end with an integral panel member 3 adapted to be folded rearwardly whereby the panel member 2 may be supported in an upright position upon a suitable surface such as the top of a counter or in a display window. The device, shown in operative set-up in Fig. 2, may be formed from a one piece flat blank such as shown in Fig. 4. The blank may be die-cut from a sheet of flat, flexible material such as paper, plastic or light metal. For ease in forming the device from the blank, for economy of manufacture and for general utility the present device may preferably be made of relatively stiff paper or cardboard.

As shown in Fig. 4, the blank which is utilized to form the present device embodies the back panel 2, a supporting panel or brace member 3, a base flange member 4 and an integral panel 5 disposed at one end of the panel member 2. The panel member 5 is adapted to be folded into flatwise relation to the panel 2 thereby to form the front panel member of the device as will subsequently be described. The back panel 2 of the present device is preferably relatively wider then it is high and one end of the panel is relatively higher than the other end. Thus one end of the panel 2 has an upwardly extending portion as shown at 6.

A vertical score line 7 defines one lateral edge of the back panel 2 and defines the juncture between the panel 2 and the supporting panel 3. Thus when the panel 3 is folded rearwardly along the bend line 7 into angular relation to the panel 2 said panel 2 will be supported along its greatest height.

A horizontal score line 8 on the blank shown in Fig. 4, defines the juncture between the lower edge of the back panel 2 and the base flange 4 and the score line 9 defines the juncture between the lower edge of the back panel 2 and the front panel 5. The lower edge of the panel 2 is notched as shown at 11 one side of the notch being a continuation of the lateral edge 12 of the front panel 5. The blank is also provided with a cut-away portion or slot adjacent the juncture between the panel 2 and the panel 5 as indicated at 14 whereby the panel member 5 will be joined to the panel member 2 across only part of its width for purposes as will subsequently be described. Score lines 15 adjacent the score line 9 traverse the relatively narrow portion of the blank disposed between the end of the slot 14 and the lateral edge 12 of the panel 5. A vertical score line 16 extends from the upper edge of the panel 2 to the slot 14 and a similar score line 17 extends from the slot 14 to the edge 18 of the front panel 5.

Figure 2:
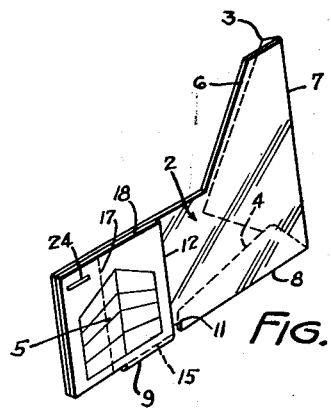
Figure 2 is a perspective view of the card supporting device with the card removed therefrom.
Figure 1:
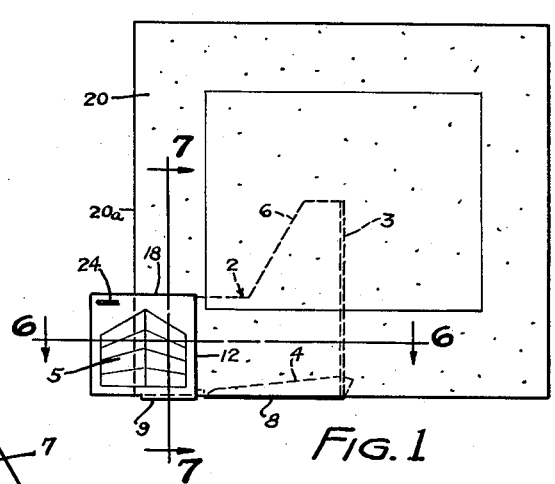
Figure 1 is a front elevational view of a card supporting device embodying features of the present invention and a card supported thereby.
Figure 5:
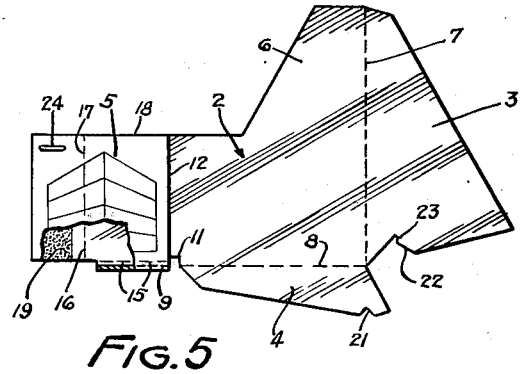
Figure 5 is a view similar to that of Fig. 4 but with the front panel member folded into flatwise relation to the back panel member and secured thereto.
Figure 7:
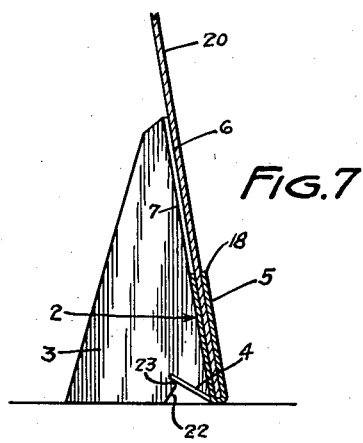
Figure 7 is a vertical sectional view taken on the line and looking in the direction of the arrows 7—7 of Fig. 1.
Figure 6:
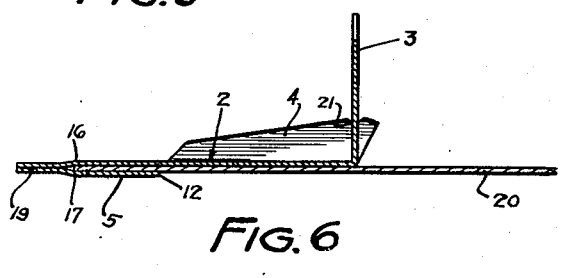
Figure 6 is a plan sectional view taken on the line 6—6 of Fig. 1.

In forming the device from the blank, shown in Fig. 4, the panel member 5 is folded along the bend line 9 into flatwise relation to the back panel 2 as shown in Fig. 5. Thus the front panel 5 and the back panel 2 have common superimposed areas when thus folded together. To maintain the two panel members in superimposed relation the panel members are secured together along only a portion of their common areas thus leaving the remainder of their common areas unsecured yet adapted to flex apart when a portion of a card is interposed therebetween. Thus in the instant device the lateral marginal edge portion of one of the panel members may be provided with adhesive, as indicated at 19 upon the back panel 2, whereby when the front panel 5 is folded upon the back panel 2 the said panels will be secured together along one lateral marginal edge portion. As the panel members are of relatively stiff material, such as cardboard, the secured together portions of the panels resist separation of the unsecured portions thereof whereby when the corner of a card 20 is interposed between the panel members, as shown in Figs. 1, 6 and 7, the card will be firmly clamped therebetween. As relatively large clamping areas are provided between the panel members 2 and 5 it will be understood that the card is thus maintained in superimposed relation to the back panel member 2. The superimposed panels 2 and 5 thus form a pocket that is open at the top and one end and the opposed clamping areas provide smooth unobstructed surfaces whereby the card may readily be positioned therebetween as will be understood.

Means for maintaining the device in an upright position upon a suitable surface, such as the top of a counter, comprises the panel member 3 which is folded rearwardly along the bend line 7, as before stated. When the device is formed of sheet metal or plastic the panel 3 will maintain its angular relation to the panel 2 but when the device is formed of cardboard the panel 3 is preferably locked in operative position relative to the panel 2.

For thus locking the supporting panel 3 in operative relation to the panel 2 the integral flange 4 may be provided with a notch 21 which is disposed substantially on a line with the bend line 7 as shown in Fig. 4. The lower edge of the panel 3 is cut away adjacent the vertical bend line 7 whereby a cam edge 22 and a recess 23 are provided as shown in Fig. 4. After folding the panel 3 rearwardly into right angular relation to the panel 2 the flange 4 is folded rearwardly along the bend line 8. The flange 4 is then folded upwardly whereby the bottom of the notch 21 engages the cam edge 22 on the panel 3 and upon continued upward movement of the flange 4 said flange will snap into position in the recess 23 thus interlocking the panel member 3 and the flange 4. Thus the flange 4 cooperates with the panel 3 to maintain said panel in operative relation to the back panel 2. The distance between the bottom of the notch 21 and the bend line 8 is a little more than the distance between the bend line 8 and the top of the cam edge 22, when the panel 3 is in a rearwardly folded position, so that a wedging action is necessary to move the edge of the flange 4 into the recess 23. Thus the flange 4 and the panel 3 are maintained in interlocking relation.

When the flange 4 and the panel 3 are thus interlocked the flange 4, the panel 3 and the panel 2 provide a rigid supporting structure. The flange 4, extending along the bottom of the panel 2, stiffens said panel materially.

The lower edge of the panel 3 of the device preferably forms an acute angle with the bend line 7 whereby when the panel 3 is disposed in angular relation to the panel 2 the device will be supported in an upright rearwardly tilted position.

Means are provided whereby cards of varying thicknesses are adapted to be received in the pocket provided between the panels 2 and 5 in such manner that the opposed inner clamping surfaces of the panels 2 and 5 will be maintained in parallel relation. Thus the horizontal score lines 15 adjacent the bend line 9 allow the lower ends of the panels 2 and 5 to move apart when the corner of the card 20 is interposed therebetween as shown in Fig. 7. The vertical score lines 16 and 17 on the panels 2 and 5, respectively, provide means whereby the opposed lateral ends of the panels 2 and 5 adjacent the closed end of the pocket are similarly adapted to move apart as shown in Fig. 6. Thus a flexible pocket is provided by the panels 2 and 5 whereby the bottom of the pocket and the closed lateral end thereof are adapted to expand thereby adapting said pocket to receive cards of varying thicknesses.

It is to be noted that the superimposed relation of the front panel 5 to the back panel 2 provides a horizontally disposed upper marginal clamping area adjacent the upper edge 18 of the panel 5, said area being disposed a distance above the lower edge of the panel 2. Thus the card 20, when interposed between the panels 2 and 5, is prevented from tipping forwardly from the panel 2. Similarly a vertical marginal clamping area adjacent the vertical edge 12 of the front panel 5 and disposed remote from the side edge 20a of the card 20, when positioned between said panels, prevents the card from swinging away from the panel 2. Thus with the corner of the card interposed between the panels 2 and 5 with the lower edge of the card positioned at the bottom of the pocket formed by the panels 2 and 5 the card will be maintained in superimposed relation to the back panel 2. It is to be understood that the entire unsecured common superimposed areas of the panels 2 and 5 are adapted to engage the corner of the card and maintain the card against the back panel 2.

If desired the panels 2 and 5 may be secured together by additional means such as a staple 24 adjacent the upper corners thereof as shown. When the staple 24 is used the adhesive 19 may or may not be used as may be desired.

Thus it will be noted that a card supporting device is provided adapted to support a card in an upright rearwardly tilted position upon a counter or any other suitable surface. With one corner of the card interposed between the panel members 2 and 5 and with the lower edge of the card disposed at the bottom of the pocket thus formed, as shown in Fig. 1, the lower edge of the card will be disposed in contiguous relation to the lower edge of the back panel 2 and thus disposed to rest upon the surface upon which the device is positioned. Thus the weight of the card is largely translated to the supporting surface rather than carried directly upon the supporting device.

The front panel 5 of the device provides space for suitable pictorial or printed embellishment and the end portion of the panel 5 which extends outwardly from the edge 20a of the card 20 is not undesirable as it gives added space for printed matter. It is to be understood that the front panel 5 need not be of rectangular configuration but may be of irregular contour if desired. It is also to be understood that the portion of the back panel 2, upon which the front panel 5 is folded, may be relatively higher than the front panel if desired.

As shown in Fig. 1 it is to be noted that the end of the back panel 2 which includes the upwardly extending portion 6 is disposed at a median portion of the card 20 thereby providing a substantial backing for the card. It is an anticipated feature of the invention that the pocket end of the supporting device may remain constant in size for a plurality of sizes of cards and that the width and overall height of the back panel 2 may be varied depending upon the size of the card to be supported by the device.

The above described embodiment of the present invention is particularly adapted to support relatively thin cards wherein the corner of the card is wedged between the panels 2 and 5. Thus the supporting device is clampingly secured to the card and the card and the device may be moved about as a unitary structure.

Figures 8 to 14, inclusive, of the drawings, illustrate a card supporting device embodying features of the present invention including means whereby the device is adapted to receive and support relatively heavy cards as well as thin cards.

The blank for forming the instant device is shown in Fig. 9 and comprises a back panel member 26, a supporting panel 27 and a panel member 28 formed integrally with the back panel 26 and adapted to be folded into flatwise relation to said panel 26 thereby to provide the front panel member of the device. The supporting panel 27 is folded rearwardly into operative relation to the back panel 26 along the vertical score line 29. The back panel 26 has an upwardly extending portion 30 disposed adjacent the bend line 29.

Means are provided whereby the supporting panel 27 may be fixedly maintained in angular relation to the back panel 26. Such means comprises a locking element or tab 31 made integral with the back panel 26 and formed by slitting portions of the panel 26 and the supporting panel 27 whereby the locking tab 31 is attached to the back panel 26 along a horizontal score or fold line 32. Thus, when the supporting panel 27 is folded rearwardly into operative position with respect to the back panel 26, the tab 31 is folded rearwardly along the score line 32 and the notch 33 on the outer edge of the tab 31 is engaged with the edge 34 of the supporting panel 27 thereby rigidly locking the panel 27 in position, as clearly shown in Figs. 11 and 13.

A particular feature of the instant device is the provision of means whereby the front panel member 28 may flex away from the back panel 26, when a card is interposed between said panels, with no resultant distortion to the front panel 28. As shown in Fig. 9 the back panel 26 is provided with a slot 35 extending downwardly from its upper edge adjacent the vertical side edge 37 thereof. Thus the back panel 26 is provided with a relatively narrow portion 36 which is defined by the upper portion of the panel 26 disposed between the vertical side edge 37 thereof and the vertical edge 38 which defines one side of the slot 35.

Figure 12:
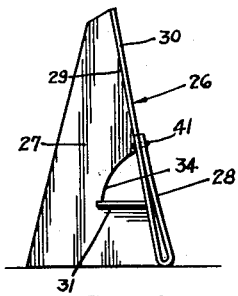

The panel member 28 is folded along the score lines 39 into flatwise relation to the back panel 26, said score lines traversing the panel 28 adjacent its juncture with the back panel 26. A plurality of score lines 39 may be provided whereby a roll or loop connects the lower ends of the panels 26 and 28 when the front panel 28 is in folded position upon the back panel 26. Thus the lower end of the front panel 28 will be disposed in spaced relation to the lower end of the opposed portion of the back panel 26 as shown in Figs. 11 and 12. When the front panel 28 is folded into flatwise relation to the back panel 26 the upper end of the front panel 28 is disposed in superimposed relation to the opposed upper end portion of the back panel 26 and is secured thereto by suitable means such as a staple 41. It is to be noted that the staple 41 secures the upper end of the front panel 28 to the upper end of the narrow portion 36 of the back panel 26. Thus the common superimposed areas of the upper portions of the panels 26 and 28 disposed to the left of the slot 35, as viewed in Fig. 10, are secured together and the common superimposed areas of said panels disposed to the right of the slot 35 are separate and thus adapted to flex apart when a card is interposed therebetween.

Figure 13:
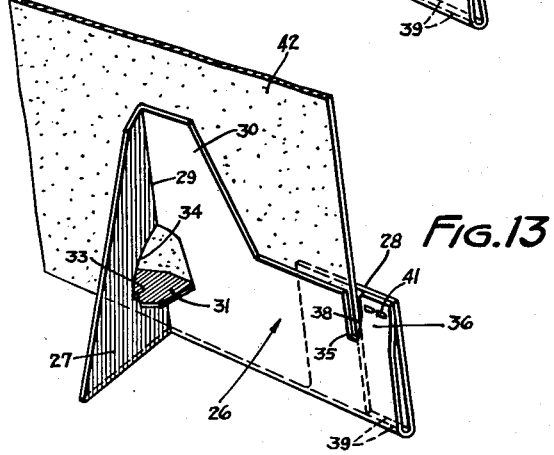
Figure 14:
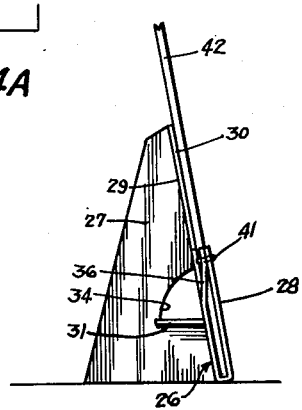

As shown in Figs. 11 and 12 the upper end portion of the front panel 28 is disposed in superimposed relation to the opposed upper end portion of the back panel 26. When a corner of a card 42 is positioned between the panels 26 and 28, as shown in Figs. 13 and 14, the opposed upper separate portions of the panels flex apart against the tension of the yieldable, narrow portion 36 of the back panel 26 as will be understood. The vertical edge 38 of the narrow portion 36 provides an abutment against which the vertical edge of the card may be positioned.

When the card is interposed between the panels 26 and 28 and the lower edge of the card disposed at the bottom of the pocket formed by said panels the lower edge of the card will be in contiguous relation to the lower edge of the back panel 26. Thus the lower right hand corner of the card, as viewed in Fig. 8, will be disposed to rest upon the surface upon which the device is positioned. Thus the device functions to maintain a card in an upright position in such manner whereby the full weight of the card is not carried by the supporting device. The upwardly extending portion 36 of the back panel 26 and the supporting panel 27 are disposed at a median portion of the card whereby the card is provided with a substantial backing thereby to prevent rearward flexing of the card.

The present device may be formed of sheet metal or plastic in which case the supporting panel 27 will maintain its angular relation to the back panel 26 without the need of the interlocking tab member 31. When formed of flexible sheet metal or plastic the lower ends of the panels 26 and 28 are preformed in spaced relation as shown in Figs. 11 and 12 and the upper end of the narrow, yieldable member 36 and the front panel 28 are secured together by cementing or other suitable means. The member 36 thus maintains the opposed upper separate marginal edge portions of the panels 26 and 28 in yieldable superimposed relation, whether the device is made of paper or resilient material, whereby cards of varying thicknesses may be interposed therebetween. Thus a card is maintained against the back panel 26 whereby said card is maintained in an upright position as before described.

When the blank for forming the instant device is made of paper it may be desirable to fold the front panel 28 into flatwise relation to the back panel 26 whereby its entire area is disposed in superimposed relation to the panel 26. Thus when the corner of a card is interposed between said panels the lower end of the front panel 28 will flex away from the lower end of the panel 26 along the score lines 39 as will be understood. Thus a relatively thin card will be clamped between the lower opposed portions of said panels as well as between the upper marginal edge portions thereof as previously described.

Figure 14A, of the drawings, illustrates a card supporting device embodying component parts similar to the just previously described device but wherein a structural difference lies in the method of superimposing the front panel member upon the rear panel member.

Figure 8:
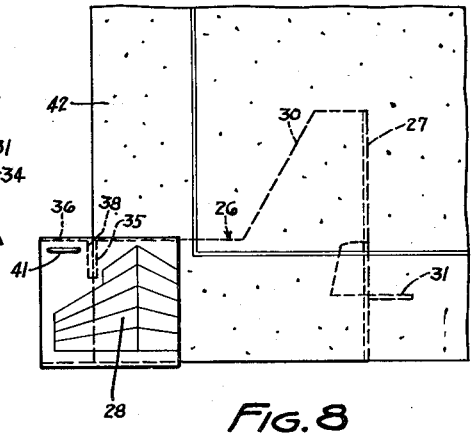

The back panel 46 is provided with a rearwardly extending supporting panel 47 at one end thereof which is adapted to maintain the panel 46 in an upright position similar to the device shown in Fig. 8. The front panel member 48 is integrally formed with the rear panel 46 and before folding upon the panel 26 is a lateral extension thereof as indicated in dotted lines in Fig. 14A. The panel 48 is folded upon the back panel 46 along the vertical bend line 49 and the panels 46 and 48 are then secured together by means of the staple 50 which is disposed inwardly from the bend line 49 and preferably adjacent the upper portions of the panels 46 and 48. The bend line 49 defines a common vertical edge of the panels 46 and 48. The back panel 46 has a vertical slit 51 extending downwardly from its upper edge said slit being disposed adjacent the secured-together portions of the panels 46 and 48, namely adjacent the securing staple 50, whereby said staple is disposed between the slit 51 and the vertical edge 49.

Thus the panels 46 and 48 are disposed in superimposed relation whereby the common superimposed areas of said panels to the left of the slit 51, as viewed in Fig. 14A, are secured together by means of the staple 50. The common superimposed areas of said panels 46 and 48 to the right of the slit 51 are separate whereby the corner of a card may be interposed therebetween. The pocket formed by the superimposed panels 46 and 48 of the present device is thus open at the top and the bottom and one side whereby when the device is positioned upon a suitable surface and the lower corner of the card 53, indicated in dot and dash lines, is positioned between said panels the entire lower edge of the card will be adapted to rest upon said surface. The slit 51 in the back panel 46 allows the upper portion of the panel 46 disposed to the right of said slit, as viewed in Fig. 14A, to flex rearwardly when a card is interposed between the panels 46 and 48. Thus the upper marginal edge portions of the panels 46 and 48 are maintained in parallel relation thus clamping the card firmly therebetween. The vertical edge 52 which defines one side of the slit 51 provides an abutment for the vertical edge of the card 53. The relative stiffness of the front panel 48 maintains the card 53 in superimposed relation to the back panel 46 whereby said card is supported in an upright position as will be understood.

Figures 15 to 21, inclusive, of the drawings, illustrate a further embodiment of the invention wherein a card supporting device is provided with a card receiving pocket having its closed lateral end formed by the juncture of the front and back panels. Thus a card supported by the instant device, wherein one corner of the card is positioned in said pocket, will have a lateral edge portion and a bottom edge portion disposed in contiguous relation to a lateral edge and a bottom edge respectively of the front and back panel members. The card will be maintained in flatwise relation against the back panel by the entire superimposed area of the overlaying front panel member.

The blank from which the instant device is formed is shown in Fig. 16 and comprises the back panel 56 and a supporting panel 57 adapted to be folded rearwardly along the vertical score line 59. The panel 56 is provided with an upwardly extending portion 58 and an integral locking tab 61 having a notch 63 is adapted to be bent rearwardly along the score line 62 to interlock with the rearwardly bent supporting panel 57.

A panel member 65 formed integrally with the back panel 56 provides the front panel member of the device and is folded into flatwise relation to the back panel 56 along the vertical score line 66, as indicated in dotted lines in Fig. 16. The score line 66 thus defines a common lateral edge of the panels 56 and 65 as shown in Fig. 17. The lower edge portion of the blank is preferably cut away whereby the horizontal edge 67 thus formed is disposed upwardly from the lower edge 68 of the back panel 56. The cut away portion and the edge 67 is extended laterally into the panel 65, the end of the cut away portion being disposed on a line with the vertical score line 69 which is provided upon the panel 65 adjacent the bend line 66. A similar vertical score line 71 is provided on the back panel 56 adjacent the bend line 66.

The panel member 65 is provided with a tab 72 adapted to be folded along the horizontal bend line 73. Suitable adhesive 74 is provided upon the tab 72 whereby when the panel 65 is folded into flatwise relation against the back panel 56 the tab 72 is subsequently folded rearwardly and upwardly along the bend line 73 and the adhesive portion 74 engaged with the back of the back panel 56, as shown in Fig. 19, thereby securing the front panel 65 in superimposed relation to the back panel 56. Additional horizontal score lines 75 traverse the front panel 65 and the integral tab 72, respectively, adjacent the bend line 73 said score lines providing means for expansion of the lower end of the pocket formed by the superimposed panels 56 and 65.

With the front panel 65 in overlaying position upon the back panel 56, as shown in Figs. 15 and 19, it will be noted that the opposed surfaces of said panels are disposed in superimposed parallel relation. It is important that the panels 56 and 65 be adapted to flex apart and maintain said parallel relation when the corner of a card is interposed therebetween. Thus the vertical score lines 69 and 71 adjacent the bend line 66 allow the opposed lateral ends of the panels 56 and 65 to flex apart when the card 70 is positioned therebetween as shown in Fig. 21. Similarly the horizontal score lines 75 adjacent the bend line 73 allow the lower end of the front panel 65 to flex away from the lower end portion of the back panel 56, as shown in Fig. 20. Thus the front panel 65 will be maintained in parallel relation to the back panel 56 whereby the entire inner surface of the front panel 65 will engage against the card and thus maintain the card against the back panel 56.

It is a feature of the present invention that the hereinbefore described embodiments of the invention comprise supporting devices wherein the entire device is formed from a single blank. It is within the purview of the invention, however, that, if desired, the front panel member of each device may be formed from a separate piece and subsequently suitably secured to the rear panel member, it being understood that the functional features of the respective front and rear panel members of each device are maintained similar to the devices previously disclosed and described.

Figures 22 to 25, inclusive, illustrate a card supporting device wherein a detachable, resilient clamping member is provided adapted to overlay an end portion of the back panel whereby the corner of a card may be positioned beneath the clamping member thereby to maintain the card in superimposed relation to the back panel member.

As shown in Fig. 22 the back panel 76 of the device is provided with an integral rearwardly extending supporting panel 77 adapted to maintain the panel 76 in an upright, rearwardly tilted position. The panel 76 is provided with an upwardly extending portion 78 said portion adjoining the bend line 79 along which the supporting panel 77 has been folded into angular relation to the panel 76. A locking tab 81 is provided adapted to be folded rearwardly along the bend line 82 whereby the bottom of the notch 83 will engage the supporting panel 77 and thus lock the panel 77 in operative position with respect to the panel 76.

Means for maintaining a card against the back panel 76, whereby the card will be maintained in an upright position, comprises a resilient strap-like panel member generally indicated 85, said member being adapted to overlay a lower corner portion of the panel 76 as shown in Fig. 22. The member 85 normally engages against the panel 76 with an initial tension whereby when the corner of a card is interposed between the member 85 and the panel 76 the card will be maintained in superimposed relation to the panel 76.

The member 85 is preferably preformed of resilient sheet metal or plastic and is provided with resilient loops 86 and 87 adapted to embrace a lateral edge portion and a bottom edge portion, respectively, of the panel 76 as shown in Fig. 22. The loops 86 and 87 have rear leg portions 88 and 89, respectively, adapted to be engaged in flatwise relation against the back side of the panel 76 and front leg portions 91 and 92 adapted to yieldably engage against the front face of the panel 76. An integral strap-like panel member 94 connects the leg portions 91 and 92 of the resilient loops 86 and 87 and is maintained in yieldable engagement against the panel 76 by the said loops. A flange portion 95 is bent outwardly from the member 94 to facilitate the insertion of the corner of a card beneath the member 94 and the leg portions 91 and 92 of the member 85.

When the corner of the card 96 is interposed between the clamping member 85 and the back panel 76 the end portions of the legs 91 and 92 and the connecting member 94 will engage against the card and thus maintain the card in superimposed relation to the panel 76. The resilient loops 86 and 87 allow for considerable variation in the thickness of cards adapted to be supported by the device.

The member 85 may be secured upon the panel 76 by means of the clamping action of the opposed legs 88—91 and 89—92 of the resilient loops 86 and 87, respectively. If desired the member 85 may be secured to the panel 76 by cementing the legs 88 and 89 to the back of the panel or the legs may be riveted or otherwise secured to the panel 76.

A feature of the instant device is the adaptability of the overlaying member 85 for use when the blank comprising the panels 76 and 77 is folded into either a "right" or a "left" supporting device. As shown in Fig. 25 the blank has been folded to provide a device which is the reverse of that shown in Fig. 22. In adapting the overlaying member 85 to this device the member 85 is simply rotated counterclockwise 90 degrees from the position shown in Fig. 22. Thus the loop member 87 is disposed to embrace a lateral marginal edge portion of the panel 76 while the loop 86 embraces a lower marginal edge portion thereof. Thus the device of Fig. 25 functions to maintain the card 96 in an upright position wherein the lower right hand corner of the card is interposed between the overlaying member 85 and the back panel 76. Thus it is to be noted that the instant device functions to maintain a card in superimposed relation to the back panel in a manner similar to the previously described embodiments of the present invention.

The instant device and the previously described devices embody clamping means overlaying the back panel member said clamping means having a horizontal marginal edge portion disposed a distance above the lower edge of the back panel and a vertical marginal edge portion disposed remote from a lateral edge of the said panel. Thus when a card is interposed between the overlaying clamping means and the back panel the card will be maintained in superimposed relation to the panel and the aforementioned horizontal and vertical marginal edge portions will prevent the card from tipping forwardly away from the panel and from swinging away from the lower edge of the panel.

It is within the purview of the invention that resilient loop members similar to the loop members 86 and 87 may be formed as independent units and mounted upon the panel 76 in diagonally disposed relation. Thus the individual loop members may be disposed upon the panel 76 in the same relative position as shown in Fig. 22 or the relative positions of the loop members on the panel may be varied depending upon the size of the card to be supported by the device.

As many apparently widely different embodiments of this invention may be made without departing from the spirit and scope thereof, it is to be understood that I do not limit myself to the specific embodiments herein.

What I claim is:

1. In a display device of the class described, a back panel having means for retaining it in an upright operative position, a relatively smaller front panel overlying and concealing only a portion of the back panel, and means for securing only limited portions of the front panel to the back panel whereby a portion of said front panel is unsecured, said unsecured panel portion cooperating with the concealed portion of the back panel to provide normally contacting gripping surfaces adapted to grip a portion of a display card and support the display card in an upright position.

2. A display device according to claim 1, wherein means is provided on the back panel for preventing visible distortion of the front panel when a display card is supported in said device.

3. In a display device of the class described, a back panel having a lateral extension at one end and provided at its opposite end with means for retaining it in an upright operative position, a relatively smaller panel overlying and substantially concealing said lateral extension, means for securing only limited portions of the front panel to said extension whereby the remaining portion thereof is unsecured, said unsecured front panel portion cooperating with the concealed portion of the back panel to provide complemental gripping surfaces adapted to grip a portion of a display card and support it in an upright position, and a reentrant vertical slit in the upper edge portion of the concealed portion of said extension, thereby to facilitate flexing of the gripping portions of said panels, when a card is inserted therebetween.

4. A display device according to claim 1, wherein the horizontal length of the front panel is but a fraction of the length of the back panel and overlies only a corner portion thereof.

5. A display device comprising a body formed from a blank of relatively stiff sheet material providing a back panel having a lateral extension at one end, the opposite end portion of said blank being rearwardly folded to provide a member for supporting said panel in an upright operative position, a front panel portion overlying said lateral extension and a small portion of the back panel and being secured to said extension whereby the portion of the front panel which overlies the back panel is unsecured and cooperates with the adjacent portion of the back panel to provide co-acting gripping surfaces adapted to receive and grip a corner of a display card and support said card in an upright operative position.

6. A display device according to claim 5 wherein the front panel is secured to said lateral extension along its lower edge and at an upper portion thereof, thereby to provide an inwardly and upwardly facing pocket for receiving a lower corner of the display card.

7. A display device composed of a blank of relatively stiff sheet material forming a back panel having a lateral extension at one end and the opposite end of said blank being vertically scored to facilitate bending a portion of said blank rearwardly to provide a member for supporting said panel in an upright operative position, said panel also having a rearwardly extending horizontal flange-like element at its bottom having means adapted to interlock with means on said member to secure said member in panel supporting position, a front panel overlying said extension and the adjacent corner portion of the back panel and having at least a portion of its bottom edge disposed in fixed relation to the back panel, and an upper portion of said front panel also being secured to said extension whereby the portion of the front panel which overlies the back panel is unsecured and cooperates with the adjacent portion of the back panel to provide co-acting gripping surfaces adapted to grip the corner of a display card and support it in an upright operative position.

8. In a display device of the class described, a back panel having means for retaining it in an upright operative position, a front panel of relatively smaller size than said back panel overlying and concealing only a portion of said back panel and having an edge portion thereof secured to said back panel whereby a portion of said front panel is unsecured, the unsecured portion of said front panel being disposed in flatwise relation to said back panel and cooperating with the concealed portion thereof to provide complemental gripping surfaces adapted to receive and support an article therebetween, the secured edge portion of said front panel yieldably resisting flexing of the unsecured front panel portion in a direction away from the back panel.

9. A display device according to class 8, wherein a re-entrant slit is provided in the upper marginal edge portion of the concealed portion of the back panel, thereby to facilitate inserting an article between said complemental gripping surfaces.

10. In a display device of the class described, a back panel having means for retaining it in an upright operative position, said back panel having a relatively smaller panel member integrally connected to an edge thereof, and folded over and concealing only a portion of the front surface of said back panel, and normally being disposed in flatwise relation thereto, said panel member and the concealed portion of said back panel cooperating to provide complemental gripping surfaces adapted to receive and support an article therebetween.

11. In a display device of the class described, a back panel having means for retaining it in an upright operative position, a front panel member of relatively smaller size than said back panel overlying and normally concealing a limited portion of the front surface of said back panel, said front panel member being formed from a resilient strap-like element having its end portions only secured to said panel at spaced points, whereby the intermediate portion of said front panel member is unsecured and is yieldably retained in flatwise relation to said back panel and cooperates with the concealed portion thereof to provide complemental gripping surfaces adapted to receive and support an article therebetween.

12. In a display device of the class described, a back panel adapted to provide a support for a display card disposed in flatwise relation thereto, said back panel having a rearwardly extending brace member secured to one end thereof for supporting said panel in an upright position, a front panel of relatively smaller size than said back panel overlying and concealing a portion of the front surface of the opposite end of said back panel, said front panel having a marginal edge portion thereof secured to said back panel and having its remaining portion unsecured, said unsecured panel portion being disposed in flatwise relation and cooperating with the concealed portion of said back panel to provide complemental gripping surfaces adapted to receive and support an article therebetween.

MAURITZ C. RANSEEN.

References Cited in the file of this patent

UNITED STATES PATENTS

| Number | Name | Date |
|---|---|---|
| 903,050 | Booth | Nov. 3, 1908 |
| 1,309,705 | Suck | July 15, 1919 |
| 1,532,290 | Wilson | Apr. 7, 1925 |
| 1,633,779 | Fisher | June 28, 1927 |
| 1,748,419 | Hurley | Feb. 25, 1930 |
| 2,285,176 | Taylor | June 2, 1942 |
| 2,379,598 | Skogh | July 3, 1945 |
| 2,380,076 | Scheyer | July 10, 1945 |
| 2,576,969 | Ranseen | Dec. 4, 1951 |